United States Patent [19]

Wheeler

[11] Patent Number: 4,942,412

[45] Date of Patent: Jul. 17, 1990

[54] FORMING MULTIPLE EXPOSURES ON SINGLE FILM SHEETS, IN A FILM PACK

[76] Inventor: Alton D. Wheeler, 3940 Fox Meadow La., Pasadena, Tex. 77504

[21] Appl. No.: 267,836

[22] Filed: Nov. 7, 1988

[51] Int. Cl.$^5$ .............................................. G03B 1/00
[52] U.S. Cl. .................................................. 354/125
[58] Field of Search ............... 354/108, 110, 120, 122, 354/124, 125

[56] References Cited

U.S. PATENT DOCUMENTS

| | | |
|---|---|---|
| 4,149,790 | 4/1979 | Smith .................................. 354/125 |
| 4,268,144 | 5/1981 | Wheeler ............................... 354/108 |
| 4,484,805 | 11/1984 | Gizzio .................................. 354/122 |
| 4,707,106 | 11/1987 | Johnson et al. ................. 354/122 X |
| 4,717,930 | 1/1988 | Wheeler ............................... 354/108 |

Primary Examiner—Brian W. Brown
Attorney, Agent, or Firm—William W. Haefliger

[57] ABSTRACT

A camera has a film pack reception zone from which film prints are ejected after film exposure, and is characterized by timewise separated exposures of different sections of an in-place film, in that zone, and ejection of the in-place film only after completion of exposure of different sections of the in-place film.

22 Claims, 5 Drawing Sheets

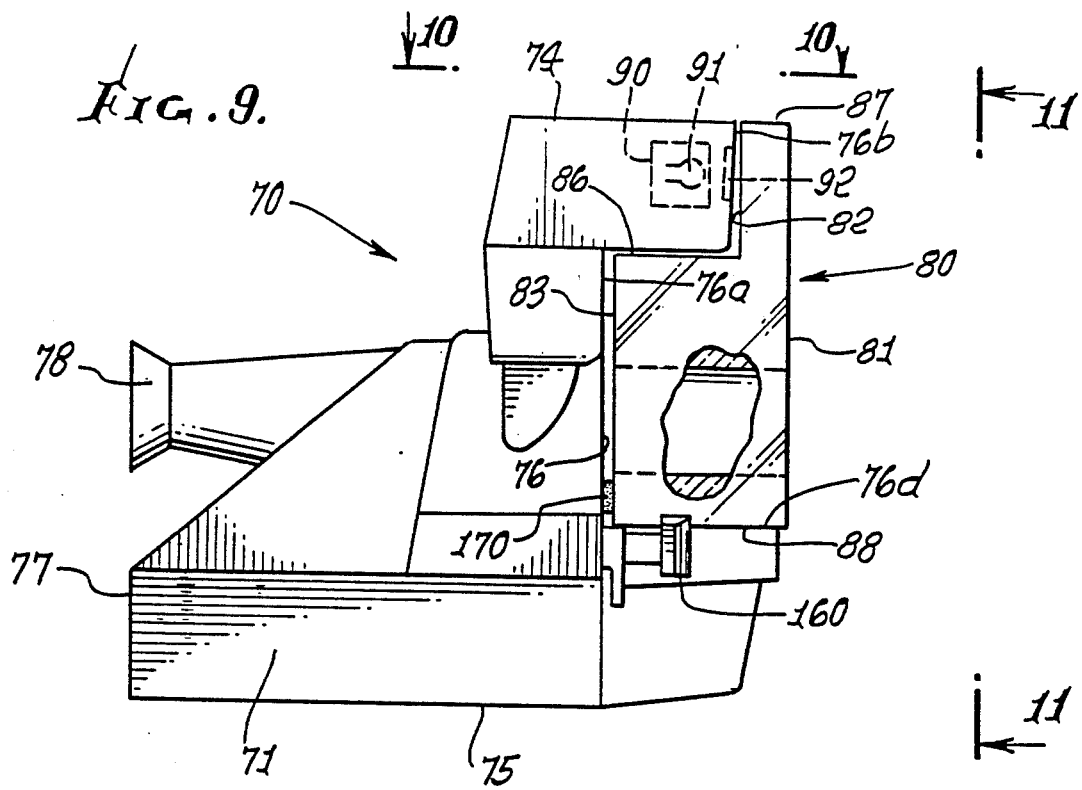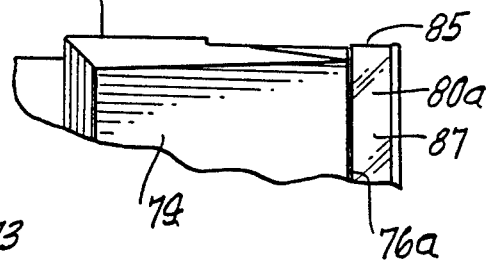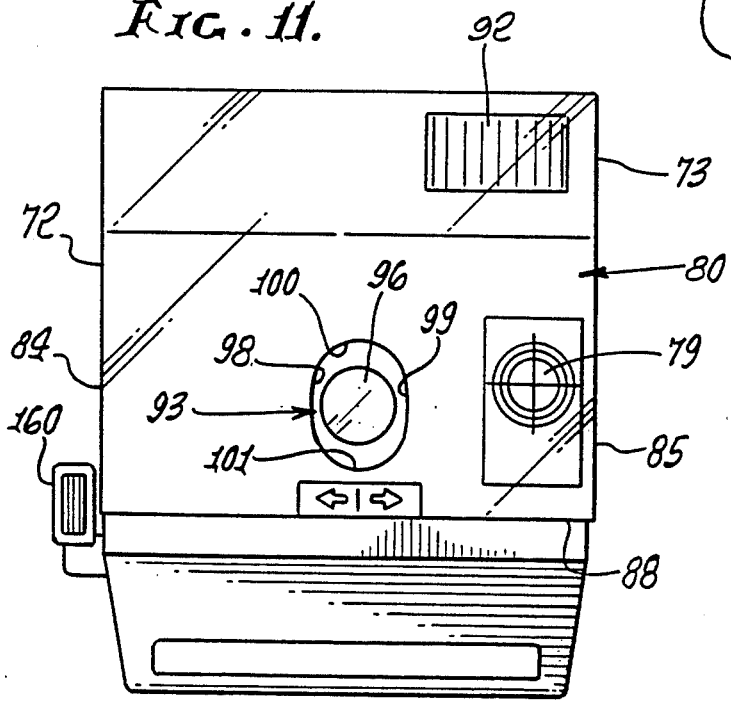

FORMING MULTIPLE EXPOSURES ON SINGLE FILM SHEETS, IN A FILM PACK

BACKGROUND OF THE INVENTION

This invention relates generally to photography, and more particurly concerns the reproducing of selected images within a camera on film subject to successive multiple exposures to light coming from sources outside a camera. The invention relates to and improves upon the disclosure of U.S. Pat. No. 4,268,144, and U.S. Pat. No. 4,717,930.

There is a perceived need for means to permit a photograph to "label" films with selected images in addition to those resulting from entrance of external light into a camera. Thus, for example, it is of great commercial advantage to form an image or service mark of a business onto films exposed to light coming from an object or building associated with that business, all at the time of the exposure of the film. Many other examples of such need for film-labeling exist. There is also a need to provide a light-modulated background for such. U.S. Pat. No. 4,717,930 discloses a device usable with a Polaroid film pack; and the device of the present invention is constructed for use with a Fuji film pack, or with a Polaroid or other film packs.

There is also need for means to halve, or even further reduce, costs of film exposures in instant-print-type cameras.

SUMMARY OF THE INVENTION

It is a major object of the invention to provide a device of the character referred to, and which is usable in conjunction with a flash camera and with exposure of a film carried by the camera when the light flash is operated. The invention is also applicable to other-type cameras. Basically, the device comprises:

(a) first means providing for timewise separated exposures of different sections of an in-place film, in a camera, and (b) second means to allow ejection of the in-place film only after completion of said exposures of said different sections of the in-place film.

It is a further object of the invention to provide such first means in the form of a template means having different zones for passing light corresponding to said separated exposures, respectively. Such a template means is typically located and in registration with the film pack reception zone, and in the camera.

It is another object to provide a template means to include a base plate defining a main opening to pass light, and the first means includes adjustable sub-plate means movable relative to the base plate to uncover different portions of said main opening. As will be seen, the adjustable sub-plate means may comprise a sub-plate mask swingably carried by the base plate. Multiples of such sub-plates may be provided.

These and other objects and advantages of the invention, as well as the details of an illustrative embodiment, will be more fully understood from the following specification and drawings, in which:

DRAWING DESCRIPTION

FIG. 9 is a side elevation or view of a camera incorporating the invention;

FIG. 10 is a fragmentary top plan view of a portion of the FIG. 9 camera, and taken on lines 10-10 of FIG. 9;

FIG. 11 is a frontal elevation on lines 11—11 of FIG. 9;

Figure 17:
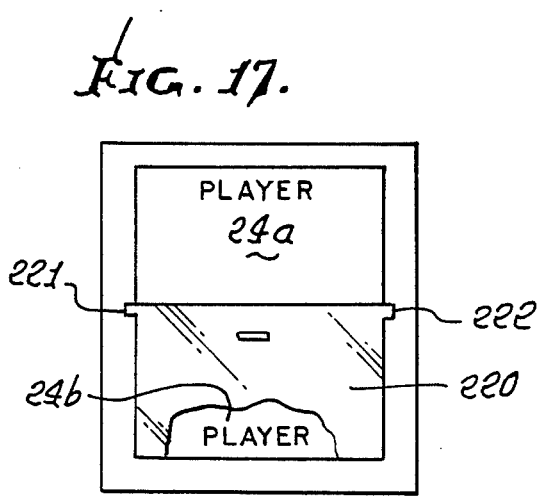

FIG. 17 a fragmentary view of a modified mask; and

Figure 18:
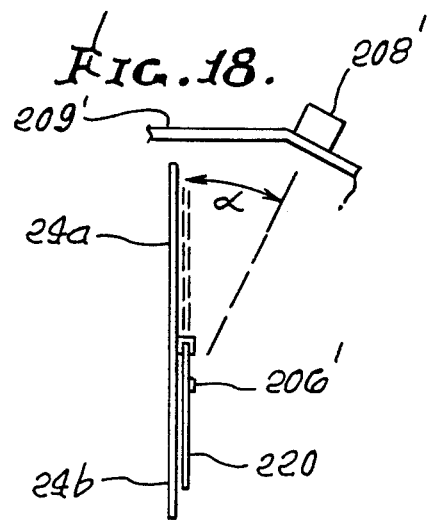

FIG. 18 is an end view of the FIG. 17 mask, and also of an actuator.

DETAILED DESCRIPTION

Referring first to FIGS. 9-11, a camera 70 includes a housing 71 having opposite sides 72 and 73, top 74, bottom 75, front wall 76, and rear wall 77. An eyepiece housing for viewing a target is shown at 78, the corresponding window in the front wall of the housing indicated at 79. The latter is seen in FIG. 11 through a transparent body or block overlying the window at the front thereof. That body also may extend across the length and width of the front of the camera housing, above level 88. Body 80 has a front wall 81, rear walls 82 and 83, opposite side walls 84 and 85, top walls 86 and 87, and bottom wall 88. Accordingly, it closely fits the space defined by housing front wall sections 76a (facing body upright wall 83), 76b (facing upright body wall 82), 76c (facing body horizontal wall 86), and 76d (facing body horizontal wall 88). The body 80 may consist of clear transparent plastic material, such as Lucite, and be positioned by camera housing walls or structure, at the front of the camera, for purposes to be described. A Polaroid camera is one example. Another example is a Fuji camera.

Figure 12:
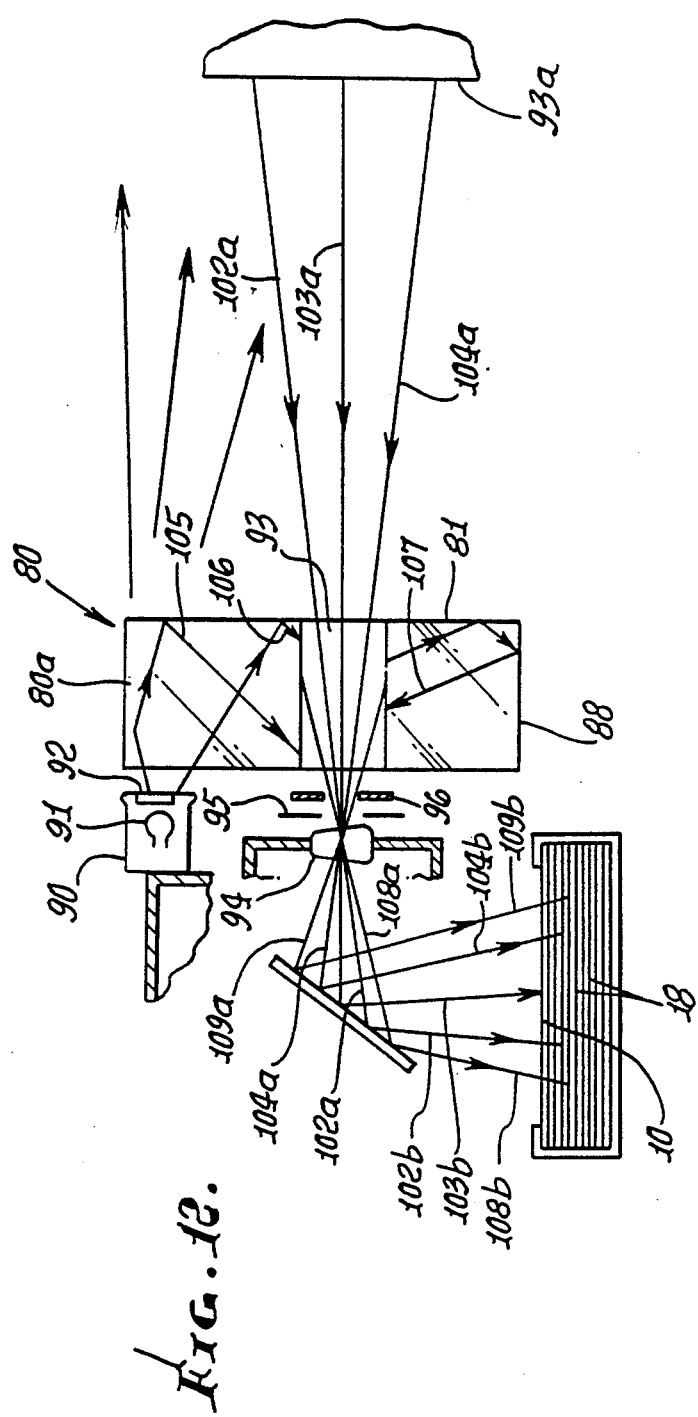
FIG. 12 is a schematic view of optical components.

The camera also includes a means for producing a light flash to illuminate the object 93 whose photograph is being taken. Such a means is indicated at 90 in FIG. 9, and may include a flash bulb 91, also seen in FIG. 12. A transparent window 92 in the camera front wall 76b passes the generated light forwardly. See also trigger 160.

Means such as block 80 is provided for channeling at least some of the light produced by the flash to a zone proximate the camera lens and extending about the direct path of light that travels from the object through the lens, to the film in the camera. That zone is generally tubular, and is indicated at 93 forward of lens 94, shutter 95, and front window 96. More specifically, the zone 93 is generally elliptical, having forwardly extending elliptical walls 98-101 formed by the block 80, those walls being roughened to diffuse light transmitted within the block and toward zone 93, impinging on such walls. Such light is transmitted from the flash bulb 91 through window 92 and into the upper extent 80a of the block 80, some of the light being reflected off the walls 81, 84, 85, and 88 toward zone 93 where it impinges on the walls 98–101. The remainder of the light from the flash passes through the block and to the object 93a, illuminating same at the time of film exposure, as by opening of shutter 95.

The direct path of light traveling from the object 93 to and through the lens (to the film 18 in the film pack) is indicated by rays 102a and 102b, 103a and 103b, and 104a and 104b, a mirror reflecting rays 102a, 103a, and 104a toward the film as rays 102b, 103b and 104b. Light channeled to zone 93 via the block 80 (see rays 105, 106, and 107, for example) illuminates diffusing walls 96–101, which may be roughened for enhanced illumination. Such illumination also passes through the lens (see rays 108a and 108b, and 109a and 109b, for example), and operates to locally illuminate the film, forming a light-modulated background to the image of the object and to the image of reproduced graphics, as will be referred to. The graphics template overlying the film 18 in the film pack is indicated at 10, and incorporates means providing for timewise separated exposures of different sections of in-place film.

Further, it will be observed that the elliptical or tubular bore defined by the walls of zone 93 has an axis generally coincident with an axis 111 defined by the camera lens, and extending forwardly.

Figure 13:
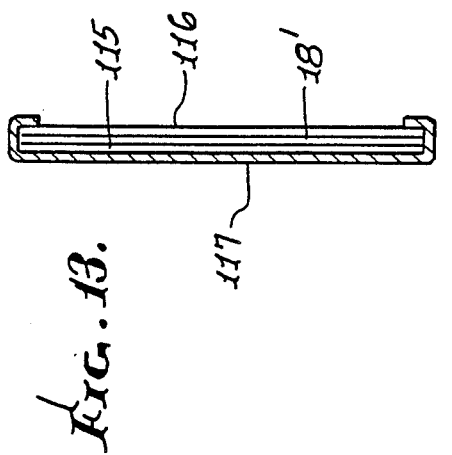
FIG. 13 shows a print in a backer.

The resultant film, when developed and displayed as a print 18' in FIG. 13, portrays light-modulated, i.e., white or near white, backgrounds on which clear images of objects appear, along with a clear image of graphics affixed to the template 10. For example, the template graphics may consist of an event representation (year, birthday, title, etc.) portrayed on the print; the portrayed objects may be in the form of portraits of a person; and these elements are on a white background obtained by the use of the channeled light from the flash. In FIG. 13, the print is mounted on a backer 115, its front is covered by a transparent sheet or disc 116, and flat receptacle 117 retains the elements in stacked relation.

Figure 14:
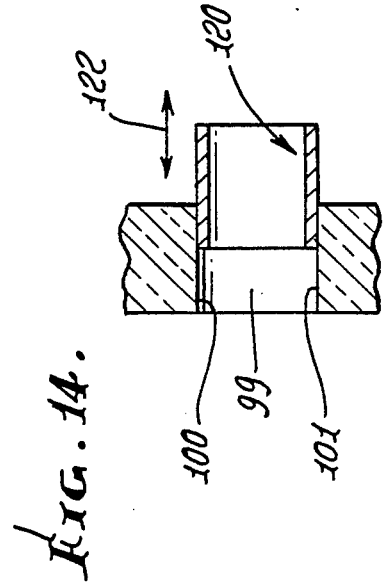
FIG. 14 shows a shiftable mask.
Figure 15:
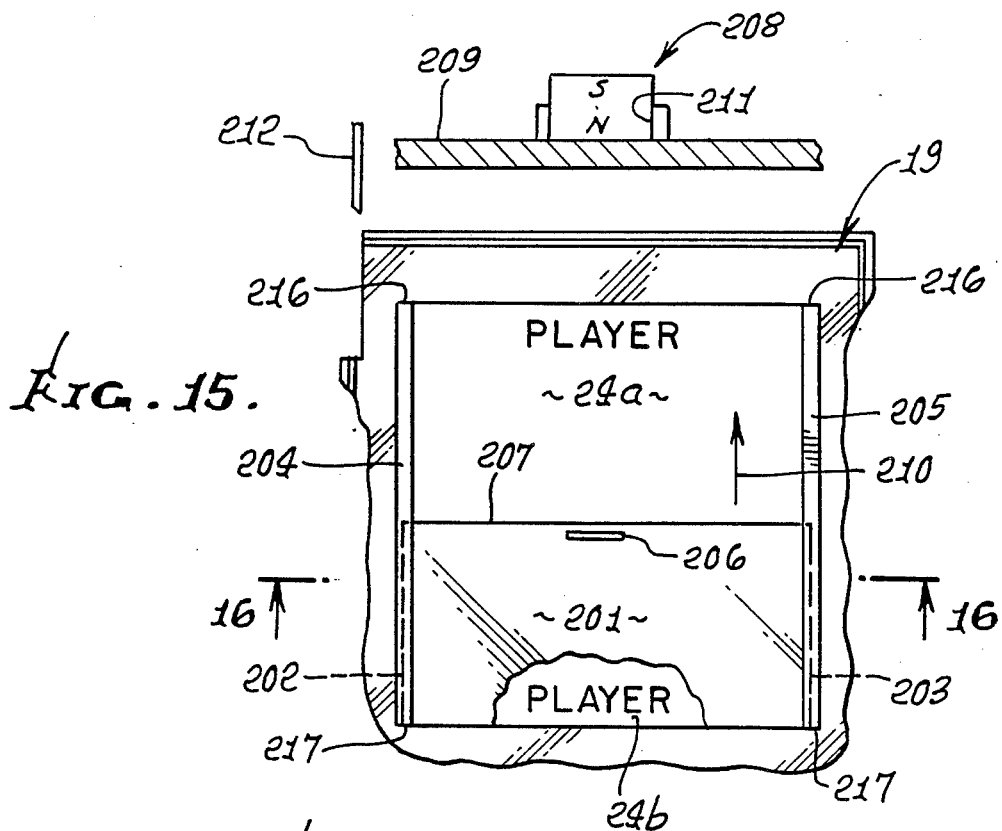
FIG. 15 is a front view of a template, shiftable mask, and actuator.

FIG. 14 shows a means such as a shiftable mask 120 to control the amount of light transmitted via walls 98–101 to the film. Mask 120 comprises a thin walled loop fitting the walls 98–101 and slidable forwardly and rearwardly (see arrow 122) to variably cover the walls. Mask 120 may be transparent and colored, such as blue or green, to add coloring to the background produced on the film.

The block walls may carry reflecting material to reflect the rays in the block. Block-mounting adhesive is shown at 170, for example.

Figure 1:
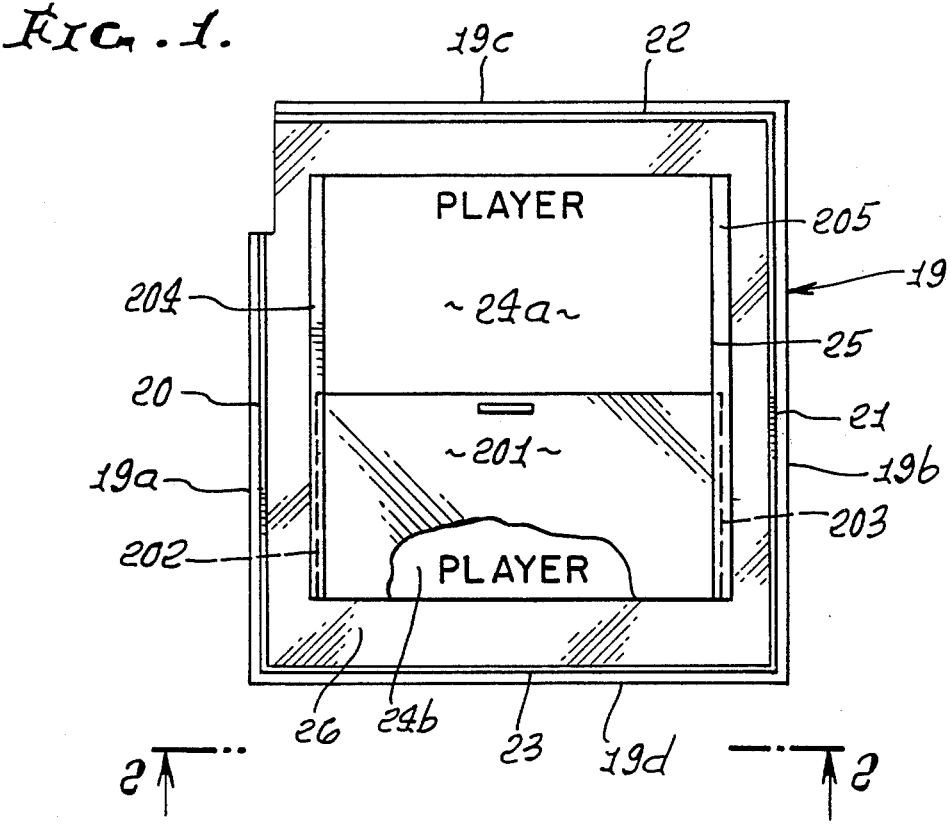
FIG. 1 is a plan view of a transparent template embodying the invention.
Figure 2:
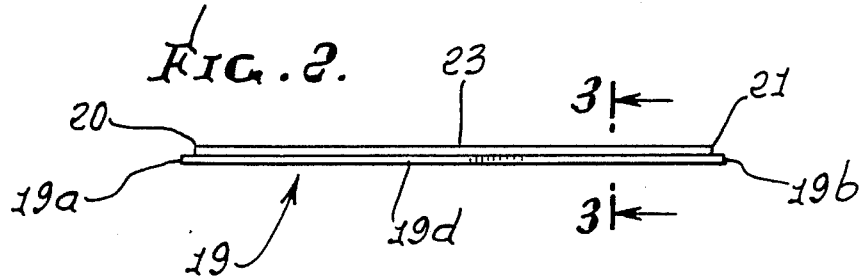
FIG. 2 is an elevation taken on lines 2—2 of FIG. 1.
Figure 7:
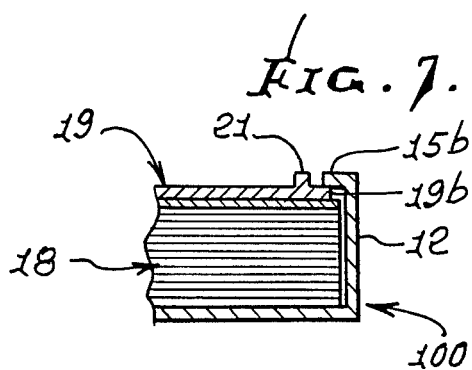
FIG. 7 is an enlarged fragmentary section taken on lines 7—7 of FIG. 4.

Referring now to FIG. 1, improved device 10 comprises a template adapted for use in conjunction with exposure of photographic film carried by structure that includes a frame. One such frame, such as a Fuji film frame, appears at 100 in FIGS. 4–8, and includes side walls 11 and 12, front and rear walls 13 and 14, a top cover having portions 15a–15d bordering an opening 16, and a bottom cover 17. That frame may consist of lightweight plastic material, as for example is exemplified by Fuji Photo Film Co., Ltd. SC037 frame for a film pack, as is seen at 18 in FIGS. 6 and 7. The portion 13b of wall 13 is removable to allow pullout removal of film, in use, and a pull tab is seen at 85.

Referring back to FIG. 1, the template is in the form of a transparent, generally planar and rectangular plastic sheet 19 adapted to cause images to be reproduced on successive film sheets 18. Merely as illustrative, the template is shown to carry the upper image "PLAYER" and lower image "PLAYER", as in the form of heavy dark lines, and those images are successively reproduced on each sheet of film 18 as that sheet is exposed to light passing through the template and onto the film, as the camera (into which the film pack is inserted) is operated The camera is operated twice to fully expose each sheet of film.

The template, which may consist of polyethylene about 0.005 inches thick, for example, has retainer ribs 20–23 which are integral with the sheet, and project outwardly from the top surface of the sheet 19, to the same extent. Rib 20 extends parallel and close to sheet edge 19a; rib 21 extends parallel and close to sheet edge 19b; rib 22 extends parallel and close to sheet edge 19c; and rib 23 extends parallel and close to sheet edge 19d.

Figure 3:
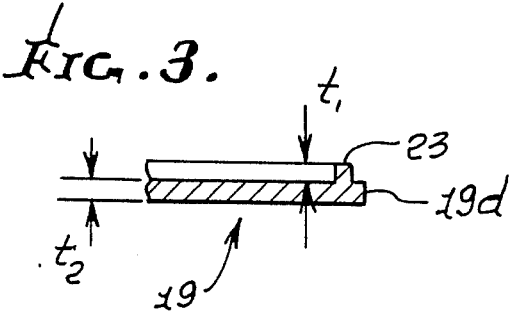
FIG. 3 is an enlarged fragmentary section taken on lines 3—3 of FIG. 1.

The ribs project outwardly to an extent "t" about equal to the sheet thickness, as seen in FIG. 3, i.e., $t_1 \approx t_2 \approx 1/32$ inch. The ribs substantially bound all of the transparent light passing zones 24a and 24b within rectangular boundary 25, the template structure at 26 outwardly of 25 being opaque. Therefore, when the film pack is in the camera, the ribs may engage camera body structure indicated for example at 28 in FIG. 6, to block light access to zones 24a and 24b in directions parallel to the plane of sheet 19. See arrow 30 designating a ray of such light.

A first laterally elongated rib 22 at one end of the template engages the laterally elongated carrier or frame edge 15c' adjacent one end 19c of the template (see FIG. 5) to prevent removal of the template in response to endwise removal, in direction 84, of exposed film from the carrier structure; i.e., the edge 19c of the sheet or template projects or fits beneath the frame top cover portion 15c, upon assembly of the template to the frame. Accordingly, one or the other of the template sheet window zones 24a and 24b remains in the path of light transmission in directions generally normal to the plane of the sheet, i.e., normal to the plane of unexposed film sheets carried by the frame or pack.

Figure 8:
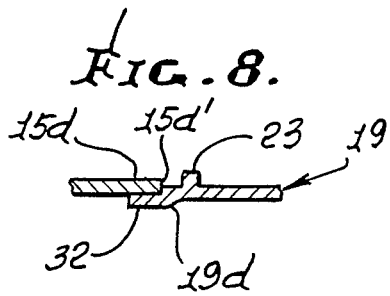
FIG. 8 is an enlarged fragmentary section taken on lines 8—8 of FIG. 4.

The second laterally elongated rib 23 at the opposite end of the template is normally spaced somewhat from the frame lateral edge 15d' (as seen in FIG. 8); however, a tab 32 integral with the underside of the template at its end 19d projects endwise as shown, to hook under the frame edge portion 15d that extends parallel to rib 23 when the first rib 22 engages the frame at 15c', as described.

Figure 4:
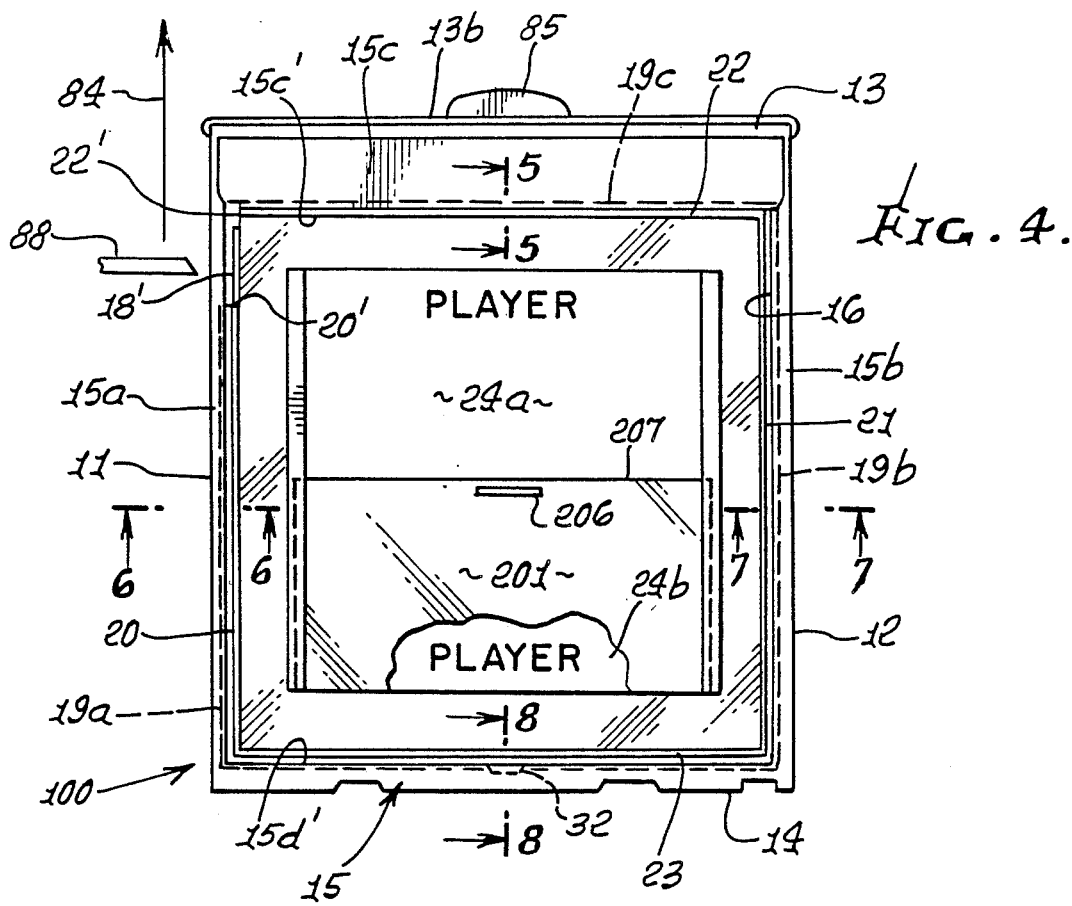
FIG. 4 is a plan view of a frame for a film pack, with the FIG. 1 template carried by the frame.
Figure 5:
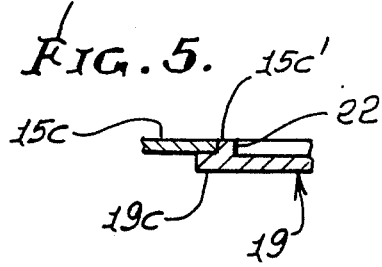
FIG. 5 is an enlarged fragmentary section taken on lines 5—5 of FIG. 4.

The third rib 20 terminates at 20' at a location spaced from one end 22' of the second rib, to provide a gap therebetween for accommodating movement of a film-retracting finger carried by the camera. FIG. 4 shows an edge portion 18' of the film in that gap, and positioned to be retracted from the pack by the retracting finger after two exposures merely as illustrated. Such a finger is schematically shown at 88.

The template, being flexible, is easily removed from its rib-determined fitted position in the frame, after frame removal from the camera, for re-use of the template upon its assembly to a fresh pack of film.

The template most advantageously has a lateral width of about 3 5/16 inches, and a longitudinal length of about 3 9/16 inches.

Figure 6:
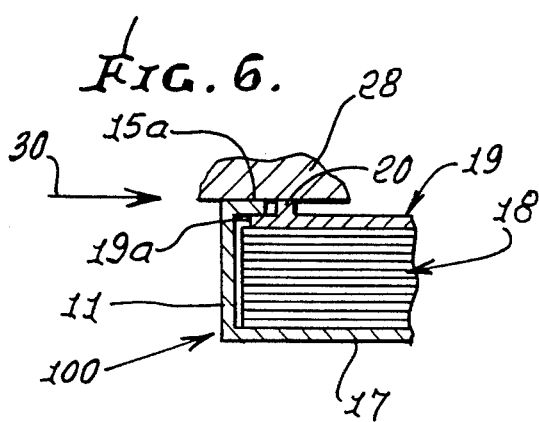
FIG. 6 is an enlarged fragmentary section taken on lines 6—6 of FIG. 4.

The fourth rib 21 extends longitudinally in slightly spaced relation to the top cover portion 15b of the frame, with template edge 19b fitting under portion 15b (see FIG. 7); and the third rib 20 extends longitudinally in slightly spaced relation to the top cover portion 15a of the frame, with template edge 19a fitting under portion 15a (see FIG. 6). Accordingly, the edges 19a and 19b of the template may be easily fitted and adjusted under the frame top cover portions 15a and 15b, upon assembly of the template to the film pack. The ribs are sufficiently thin to allow bowing or flexing of the template laterally or longitudinally upon such assembly. Rib 21 is engagable with top cover portion 15b to block rightward disassembly of the flattened (unbound) template relative to or out of the frame; and rib 20 is engagable with the top cover portion 15a to block leftward disassembly of the flattened (unbound) template relative to or out of the frame.

Further in accordance with the invention, first means is provided for timewise exposing different sections of the in-place film 18, in the light reception zone. As shown, the two such sections correspond to template zones 24a and 24b, although more than two may be provided. The light reception zone then corresponds to both 24a and 24b. Both template zones 24a and 24b may consist of thin transparent plastic material, as referred to above, i.e., a fixed "base" plate.

Figure 16:
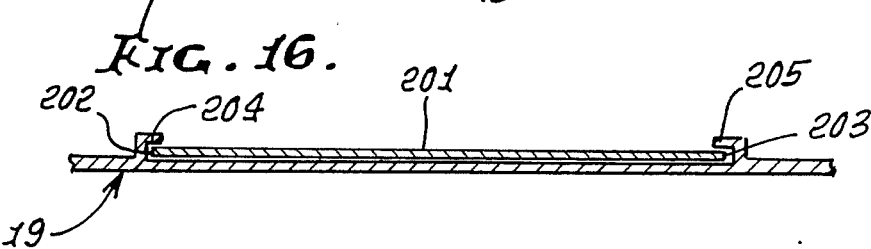
FIG. 16 is a section on lines 12—12 of FIG. 15.

Such first means may also include an adjustable sub-plate movable relative to the base plate, to uncover different portions of the main opening (zones 24a and 24b). In FIG. 1, a slider mask 201 is slidable from the first position shown, in which it covers zone 24b and leaves zone 24a open, to a second position in which it covers zone 24a and leaves 24b open. The slider mask consists of thin plastic material, having opposite edges 202 and 203 loosely fitting in tracks 204 and 205 at laterally opposite ends of the zones, as shown. See also FIG. 16.

The slider plate may carry magnetic material (for example, FeNdB powder characterized by high magnetic strength) in a thin strip 206, and near an edge 207 of the slider. An external magnet 208 of the same material, when placed against the outside wall 209 of the camera, displaces the slider in direction 210 when one pole of magnet 208 is closer to magnet strip 206, and in opposite direction 211 when the other pole of magnet 208 is closer to strip 206. Tracks 204 and 205 terminate in stops 216 and 217, as shown, to limit sliding movement of the sub-plate mask 201. Magnet 208 may be fitted frictionally into groove 211 to keep the mask in desired position corresponding to uncovering of that zone of the film to be exposed when the camera is operated In this regard, a thin blocker strip 212 may be inserted into the camera adjacent the frame 100, to block operation of finger 88 to eject the film, until both exposures of the single film sheet (i.e., on both zones 24a and 24b) are completed.

An alternate sub-plate is seen in FIG. 17 in the form of a hinged plate or mask 220, pivoted at 221 and 222 to swing between a first position as shown, covering zone 24b, and a second position covering zone 24a. FIG. 18 shows the external magnet 208' positioned at angle α to the plane of the mask to exert a magnetic force torque on the magnetic material strip 206' on the mask 220 to selectively swing the mask upwardly to broken-line position 220a covering zone 24a, or to swing the mask downwardly to full-line position shown, covering zone 24b. The magnet 208' may be endwise polarity reversed to accomplish these functions adjacent the outer wall 209' of the camera.

Thus, the effective cost of film is halved, since two exposures per film sheet 18 can be realized.

The invention is also applicable to other type mask-carrying templates, or holders, so long as a mask or masks, movable to different positions in the path of light transmission to film, are employed.

I claim:

1. In a camera having a photographic film pack reception zone from which film prints are ejected after film exposure, the combination comprising:
   (a) first means providing for timewise separated exposures of different sections of an in-place film, in said zone, and
   (b) second means to allow ejection of the in-place film only after completion of said exposures of said different sections of the in-place film,
   (c) said first means including template means having different zones for passing light corresponding to said separated exposures, respectively,
   (d) the photographic film being carried by carrier structure including a frame bounding a light passing zone,
   (e) the template means being in the form of a locally transparent, generally planar and rectangular sheet adapted to pass an image to be reproduced on the film,
   (f) the template means having multiple elongated ribs integral with said sheet, and projecting outwardly from the plane of the sheet,
   (g) said multiple ribs substantially bounding said different light passing zones to block light access to said zones in directions parallel and proximate to the plane of the sheet.

2. The combination of claim 1 wherein the template means is located and in registration with the film pack reception zone, and in the camera.

3. The combination of claim 1 wherein the template means includes a base plate defining a main opening to pass light, and the first means includes adjustable sub-plate means movable relative to the base plate to uncover different portions of said main opening.

4. The combination of claim 3 wherein said adjustable sub-plate means comprises a sub-plate mask swingably carried by the base plate.

5. The combination of claim 3 wherein the sub-plate means comprises multiple sub-plates which are relatively shiftable.

6. The combination of claim 1 wherein the camera includes a finger movable to engage and displace the film, and said block means is carried by the template means to block the finger.

7. The combination of claim 3 including actuator means adjustably positioned relative to the sub-plate means for moving the sub-plate means relative to the base plate.

8. The combination of claim 3 including guide track means on the base plate for guiding such movement of the sub-plate means.

9. In a camera having a film pack reception zone from which film prints are ejected after film exposure, the combination comprising:
   (a) first means providing for timewise separated exposures of different sections of an in-place film, in said zone, and (b) second means to allow ejection of the in-place film only after completion of said exposures of said different sections of the in-place film,
(c) said first means including template means having different zones for passing light corresponding to said separated exposures, respectively,
(d) the template means including a base plate defining a main opening to pass light via said different zones, and the fist means including adjustable sub-plate means movable relative to the base plate to uncover different portions of said main opening,
(e) and including hinge means on the base plate for hinge-connecting the sub-plate means to the base plate.

10. In a camera having a film pack reception zone from which film prints are ejected after film exposure, the combination comprising:
(a) first means providing for timewise separated exposures of different sections of an in-place film, in said zone, and
(b) second means to allow ejection of the in-place film only after completion of said exposures of said different sections of the in-place film,
(c) said first means including template means having different zones for passing light corresponding to said separated exposures, respectively,
(d) the template means including a base plate defining a main opening to pass light via said different zones, and the first means including adjustable sub-plate means movable relative to the base plate to uncover different portions of said main opening,
(e) and including actuator means adjustably positioned relative to the sub-plate means for moving the sub-plate means relative to the base plate, the actuator means comprising first magnetic means on the sub-plate, responsive to second magnetic means outside the template means to magnetically move the sub-plate.

11. In a camera having a photographic film pack reception zone from which film prints are ejected after film exposure, the combination comprising:
(a) first means providing for timewise separated exposures of different sections of an in-place film, in said zone, and
(b) second means to allow ejection of the in-place film only after completion of said exposures of said different sections of the in-place film,
(c) said first means including template means having different zones for passing light corresponding to said separated exposures respectively,
(d) the photographic film being carried by carrier structure including a frame bounding a light passing zone,
(e) the template means being in the form of a locally transparent, generally planar and rectangular sheet adapted to carry an image to be reproduced on the film,
(f) the template having multiple elongated ribs integral with said sheet, and projecting outwardly from the plane of the sheet,
(g) said multiple ribs substantially bounding all of said light passing zone to block light access to said zone in directions parallel to the plane of the sheet.

12. The combination of claim 11 including:
(a) said ribs including a first laterally elongated rib at one end of the template to engage the frame adjacent said one end of the template to prevent removal of the template in response to endwise removal of exposed film from the carrier structure, whereby the template sheet remains in the path of light transmission in directions generally normal to the plane of the sheet and to unexposed film carried by the carrier structure.

13. The device of claim 12 wherein said ribs include a second laterally elongated rib at the opposite end of the template and extending parallel to said one rib, and third and fourth longitudinally elongated ribs respectively at opposite side edges of the sheet, all of the ribs projecting substantially equally outwardly relative to the plane of the sheet.

14. The device of claim 13 wherein the third rib terminates at a location spaced from one end of the second rib to provide a gap therebetween for accommodating movement of a film-retracting finger carried by the camera.

15. The device of claim 13 wherein the fourth rib extends between ends of the first and second ribs.

16. The device of claim 11 including a retainer tab carried by the sheet at the end thereof opposite said first elongated rib, said tab projecting to hook under the frame adjacent said opposite end of the sheet, when the first rib engages the frame adjacent said one end of the template.

17. The device of claim 13 including a retainer tab carried by the sheet at the end thereof opposite said first elongated rib, said tab projecting to hook under the frame adjacent said opposite end of the sheet, when the first rib engages the frame adjacent said one end of the template.

18. The device of claim 11 wherein said ribs consist of plastic material, and are sufficiently thin to allow flexing of the sheet producing bowing of the ribs.

19. The device of claim 11 including the frame carrying stacked film directly beneath the light passing zone of the template sheet, the film adapted to be extracted parallel to the template for ejection from the camera.

20. The device of claim 11 wherein the rectangular template has the following approximate overall dimensions:
lateral width—3 5/16 inches
longitudinal length—3 9/16 inches.

21. In a camera having a film pack reception zone from which film prints are ejected after film exposure, the combination comprising:
(a) first means providing for timewise separated exposures of different sections of an in-place film, in said zone, and
(b) said first means including template means having different zones for passing light corresponding to said separated exposures, respectively, the template means being located in and in registration with the film pack reception zone, and in the camera, in registration with the film pack reception zone, and in the camera,
(c) the template means including a base plate defining a main opening to pass light via said different zones, and the first means including adjustable sub-plate means movable relative to the base plate to uncover different portions of said main opening,
(d) the template means having multiple elongated ribs integral with said base plate, and projecting outwardly from the plane of the base plate,
(e) said multiple ribs substantially bounding said main opening to block light access thereto in directions parallel and proximate to the plane of the sheet.

22. The combination of claim 21 wherein said adjustable sub-plate means comprises a sub-plate mask carried by the base plate for movement relative thereto.

* * * * *